(No Model.)

W. E. HEMMING.
FISH HOOK.

No. 254,313. Patented Feb. 28, 1882.

WITNESSES:
A. Schehl.
C. Sedgwick

INVENTOR:
W. E. Hemming
BY
ATTORNEYS.

UNITED STATES PATENT OFFICE.

WILLIAM E. HEMMING, OF REDDITCH, COUNTY OF WORCESTER, ENGLAND, ASSIGNOR TO CHARLES F. IMBRIE, OF NEW YORK, N. Y.

FISH-HOOK.

SPECIFICATION forming part of Letters Patent No. 254,313, dated February 28, 1882.

Application filed August 5, 1881. (No model.) Patented in England February 28, 1881.

*To all whom it may concern:*

Be it known that I, WILLIAM E. HEMMING, of Redditch, county of Worcester, England, have invented a new and useful Improvement in Fishing-Tackle, of which the following is a specification.

Figure 1:
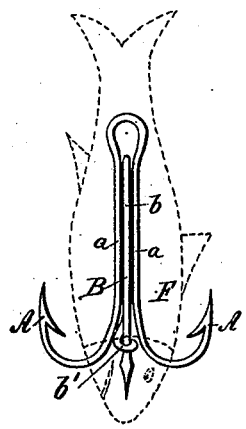
Figure 2:
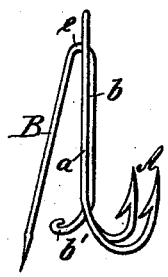
Figure 3:
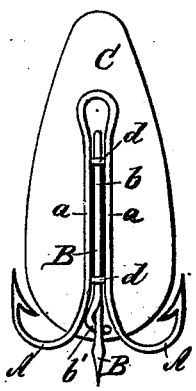

Figure 1 is a back view of my improved fish-hook, the dotted lines showing the live bait attached thereto. Fig. 2 is a side view of the hook. Fig. 3 is a front view of the hook with trolling-spoon attached.

Similar letters of reference indicate corresponding parts.

The object of my invention is to provide a barbed fish-hook or cluster of barbed fish-hooks with a baiting needle or needles, on which living bait may be placed with facility and held securely, the construction and arrangement of the baiting-needle being such that a trolling-spoon may be quickly adjusted thereon when desired, instead of living bait.

My invention consists in the combination of a baiting-needle and stop or clasp with one or more barbed hooks, as hereinafter more particularly described.

In the accompanying drawings is shown a duplex-barbed fish-hook, A A, having rigidly secured to and between its shanks *a a*, by solder or other suitable means, one side or limb, *b*, of the bent baiting-needle B, the lower end of its said limb *b* being made to terminate in the hook or stop *b'*, which acts to clasp and fasten the lower end of the needle B when it is pressed within said hook *b'* and prevent the escape of the bait or spoon from the needle B. As shown in Fig. 2, the needle B, when unhooked, springs out to an angle with its shank *b* or the shanks of the hooks, so that the bait or spoon may be readily slipped upon the needle B or removed therefrom. The needle B may be passed through any small and not necessarily vital part of a fish or other live bait, F, and when the needle B is closed in the hook or coil *b'* it will hold said live bait securely, and all chance of its escape from the adjacent hook prevented.

As indicated in Fig. 3, a trolling-spoon, C, provided with hooks or staples *d*, may, when required, be quickly adjusted on the pin B, instead of the live bait, the said spoon C being thus securely held.

It is obvious that the baiting-needle B may be attached to a single hook or any cluster of hooks, affording room for the adjustment of the bait thereon, as above described. The needle B may also have direct attachment to the shank of the barbed hook without bending over its top, as at *e*; and the retaining clasp or hook *b'* may be separately attached to the barbed hook-shank to lock the point of the needle, as above set forth.

Having thus fully described my invention, I claim as new and desire to secure by Letters Patent—

1. As an improved article of manufacture, a fish-hook made substantially as herein shown and described, with a baiting-needle, B, attached to the rear portion of its shank, as set forth.

2. The combination, with the hooks A, of the spring baiting-needle B and clasp *b'*, substantially as specified.

3. The combination, with the hooks A and baiting needle B, of the trolling spoon C, provided with hooks or staples *d*, whereby said trolling-spoon may be removably attached to and locked next the barbed hooks, substantially as herein shown and described.

WILLIAM EDWARD HEMMING.

Witnesses:
JAMES ASTOR,
ALFD. HY. CHALLERLEY.